(12) United States Patent
Gladney (10) Patent No.: US 7,331,058 B1
(45) Date of Patent: Feb. 12, 2008

(54) DISTRIBUTED DATA STRUCTURES FOR AUTHORIZATION AND ACCESS CONTROL FOR COMPUTING RESOURCES

(75) Inventor: Henry M. Gladney, Saratoga, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/465,514

(22) Filed: Dec. 16, 1999

(51) Int. Cl.
*H04L 9/32* (2006.01)

(52) U.S. Cl. ................... 726/2; 726/6; 709/223

(58) Field of Classification Search ........ 713/200–202, 713/154–155, 160–161, 165–170, 150, 153, 713/164, 182; 711/100–105; 709/314–315, 709/223, 225, 200–201, 229, 232; 707/9–10, 707/103 R, 1, 100, 100 X, 200; 705/57, 705/58, 18, 52, 56, 67, 78, 1, 44; 380/201–202, 380/241; 726/2–5, 8, 18, 27, 30; 455/463
See application file for complete search history.

(56) References Cited

U.S. PATENT DOCUMENTS

| | | | |
|---|---|---|---|
| 5,052,040 A | | 9/1991 | Preston et al. |
| 5,404,523 A | | 4/1995 | DellaFera et al. |
| 5,414,841 A | * | 5/1995 | Bingham et al. ........... 707/100 |
| 5,453,350 A | * | 9/1995 | Kurachi et al. ............. 430/527 |
| 5,475,819 A | | 12/1995 | Miller et al. |
| 5,483,652 A | | 1/1996 | Sudama et al. |
| 5,497,463 A | | 3/1996 | Stein et al. |
| 5,522,077 A | * | 5/1996 | Cuthbert et al. ........ 707/103 R |
| 5,551,028 A | * | 8/1996 | Voll et al. ................ 707/103 R |
| 5,613,105 A | * | 3/1997 | Zbikowski et al. ......... 707/100 |
| 5,644,766 A | | 7/1997 | Coy et al. |
| 5,682,534 A | | 10/1997 | Kapoor et al. |
| 5,701,458 A | | 12/1997 | Bsaibes et al. |
| 5,717,925 A | | 2/1998 | Harper et al. |
| 5,731,814 A | | 3/1998 | Bala |
| 5,740,230 A | * | 4/1998 | Vaudreuil ................. 379/88.22 |
| 5,740,231 A | * | 4/1998 | Cohn et al. .............. 379/88.22 |
| 5,758,083 A | * | 5/1998 | Singh et al. ................. 709/223 |
| 5,758,360 A | * | 5/1998 | Zbikowski et al. ......... 707/205 |
| 5,761,499 A | | 6/1998 | Sonderegger |
| 5,832,487 A | * | 11/1998 | Olds et al. ..................... 707/10 |
| 5,832,527 A | * | 11/1998 | Kawaguchi ................. 707/205 |
| 5,893,107 A | * | 4/1999 | Chan et al. ............. 707/103 R |
| 5,893,118 A | * | 4/1999 | Sonderegger ............... 707/203 |

(Continued)

OTHER PUBLICATIONS

H.M. Gladney, "Access Control for Large Collections", *ACM Transactions on Information Systems 15(2)*, Apr. 1997.

(Continued)

*Primary Examiner*—Kim Vu
*Assistant Examiner*—Leynna Ha
(74) *Attorney, Agent, or Firm*—Sughrue Mion, PLLC (57) ABSTRACT

The invention relates to using a universally unique identifier in a database to uniquely identify, both within and outside of the database system, a user. A storage system, according to the invention, includes a first storage area having an object stored therein; and a second storage area having stored therein an object identifier that identifies the object. The object identifier is unique within and outside of the storage system, and can be a Universal Unique Identifier (UUID). The invention also relates methods for storing and retrieving objects identified based on the unique identifier.

7 Claims, 7 Drawing Sheets

U.S. PATENT DOCUMENTS

| | | | |
|---|---|---|---|
| 5,966,705 A * | 10/1999 | Koneru et al. ................. | 707/9 |
| 5,974,421 A * | 10/1999 | Krishnaswamy et al. ...................... | 707/103 R |
| 6,014,666 A * | 1/2000 | Helland et al. ................ | 707/9 |
| 6,061,695 A * | 5/2000 | Slivka et al. ............... | 715/513 |
| 6,067,548 A * | 5/2000 | Cheng .................... | 707/103 R |
| 6,076,077 A * | 6/2000 | Saito ........................... | 705/51 |
| 6,076,090 A * | 6/2000 | Burroughs et al. ......... | 707/102 |
| 6,088,451 A * | 7/2000 | He et al. ....................... | 726/8 |
| 6,189,000 B1 * | 2/2001 | Gwertzman et al. .......... | 707/1 |
| 6,230,312 B1 * | 5/2001 | Hunt .......................... | 717/108 |
| 6,256,740 B1 * | 7/2001 | Muller et al. ............... | 713/201 |
| 6,343,320 B1 * | 1/2002 | Fairchild et al. ............ | 709/224 |
| 6,427,032 B1 * | 7/2002 | Irons et al. ................. | 382/306 |
| 6,442,570 B1 * | 8/2002 | Wu ............................ | 707/201 |
| 6,487,665 B1 * | 11/2002 | Andrews et al. ............ | 713/201 |
| 6,505,300 B2 * | 1/2003 | Chan et al. ................. | 713/164 |
| 6,578,056 B1 * | 6/2003 | Lamburt .................. | 715/500.1 |
| 6,625,603 B1 * | 9/2003 | Garg et al. ..................... | 707/9 |
| 6,678,696 B1 * | 1/2004 | Helland et al. ......... | 707/103 R |
| 6,760,768 B2 * | 7/2004 | Holden et al. .............. | 709/227 |
| 7,216,091 B1 * | 5/2007 | Blandina et al. ............. | 705/26 |

OTHER PUBLICATIONS

H.M. Gladney, "Condition Tests in Data Server Access Control", *IBM Research Report RJ 9244*; Mar. 1993.

J.R. Davis, "DataLinks: Managing External Data with DB2 Universal Database," prepared for the IBM Corp. by InfoIT, Inc., Aug. 1997.

J. Davis, "Extended Relational DBMSs: The Technology, Part 1," DBMS and Internet Systems, Jun. 1997.

N. Alur, J.R. Davis, "How to Improve RDBMSes—Seven Long-Term Requirements for Managing Complex Data", Byte Magazine, Apr. 1997.

K. Sollins, L. Masinter, "Functional Requirements for Uniform Resource Names," Network Working Group, RFC 1737, Dec. 1994.

R. Moats, "URN Syntax", Network Working Group, RFC 2141, May 1997.

R.J. Hayton et al., "Access Control in an Open Distributed Environment", Proc. 1998 IEEE Symposium on Security and Privacy, Oakland, May 3-6, 1998.

Andrew D. Birell et al., "A Global Authentication Service Without Global Trust", *Proc. IEEE Symposium on Security and Privacy*, Oakland, CA, Apr. 1986, IEEE Order No. 716, pp. 223-230.

Neil Ching et al., "Authorization in the Digital Library: Secure Access to Services across Enterprise Boundaries", Proc. ADL '96, 110-119, May 1996.

Carl M. Ellison, "Establishing Identity Without Certification Authorities", 6th USENIX Security Symposium, San Jose, Jul. 22-23, 1996.

Carl M. Ellison, "Raising the Security Bar", Security Technology Lab, Intel Corporation, Sep. 25, 1998.

Henry M. Gladney, "Safeguarding Digital Library Contents and Users: Document Access Control", *D-Lib Magazine*, Jun. 1997.

Henry M. Gladney, "Safeguarding Digital Library Contents and Users: Interim Retrospect and Prospects", *D-Lib Magazine*, Jul./Aug. 1998.

Henry M. Gladney, "Safeguarding Digital Library Contents and Users: A Note on Universal Unique Identifiers", *D-Lib Magazine*, Apr. 1998.

Jan Henderyckx, "Inside DB2 Data Links Manager", *DB2 Magazine*, Quarter 4, 1999: Winter, pp. 42-46.

Butler Lampson et al., "Authentication in Distributed Systems: Theory and Practice", *ACM Trans. Computer Systems*, vol. 10, No. 4, Nov. 1992, pp. 265-310.

\* cited by examiner

| USER DESCRIPTIONS | | |
|---|---|---|
| USER UUID | USER DESCRIPTION | ORG. UUID |
| UUID_1 | SMITH'S_RECORD | UUID_ORG_A |
| UUID_2 | JONES'_RECORD | UUID_ORG_A |
| ... | ... | ... |
| UUID_L | YYYY'S_RECORD | UUID_ORG_A, UUID_ORG_B |
| UUID_N | XXXX'S_RECORD | UUID_ORG_K |

FIG. 6A

| ORGANIZATION GRAPHS | | |
|---|---|---|
| ORG. UUID | ORG DESC. | ORG. MEMBERS |
| UUID_ORG_A | ORG_A | UUID_1 ... UUID_L |
| UUID_ORG_B | ORG_B | UUID_L ... UUID_M |
| ... | ... | ... |

FIG. 6B

| OBJECT INFORMATION | | |
|---|---|---|
| OBJ. UUID | OBJ. DESC. | ACCESS CONTROL INFO. |
| UUID_O1 | FILE_XYZ | UUID_A |
| UUID_O2 | DB_RECT_ABC | UUID_A, UUID_B |
| ... | ... | ... |

DISTRIBUTED DATA STRUCTURES FOR AUTHORIZATION AND ACCESS CONTROL FOR COMPUTING RESOURCES

BACKGROUND OF THE INVENTION

1. Field of the Invention

The present invention relates to the field of information storage and processing. More particularly, it relates to client/server systems, methods and program products that reduce overhead costs in authorization services, in ways that are upwards compatible from existing authorization services. It further relates to the field of intellectual property management, including administering access to stored content.

2. Description of the Related Art

Conventional access control systems and methods associate user and organization information too closely with each other and with access control information, impeding access to protected resources by remote users.

A conventional access control system is described, for example, in H. M. Gladney, *Access Control for Large Collections*, ACM Transactions on Information Systems vol. 15, no. 2, pg. 154-94 (April 1997) (hereinafter "*Gladney, Access Control for Large Collections*"), which is incorporated herein by reference. In such an access control system, access control information (i.e., privileges) for each object/user pair, or each object/group pair, is tabulated in an access control list.

However, user descriptions and group or organization information are too closely associated with those access control lists. A problem with such close association is the significant administrative burden required to maintain the access control lists that contain information about remote users who are outside the administrative domain of the system.

A university's computing system illustrates this problem, since approximately one-fourth of the university's population changes each year. Accordingly, the access control lists in each of the university's computing systems used by the graduating students must be changed to reflect that turnover. Any computing system outside the university would have to incur costs and tolerate the burden of changing that same access control information if the same university users also access the external computing systems.

Another problem with the close association of user, organization and object descriptors with access control information maintained in an administrative domain, is that it effectively limits an outside user's access to an object. The high cost of maintaining conventional access control information inhibits a user outside that administrative domain being given authorized access to objects within that domain.

Figure 1:
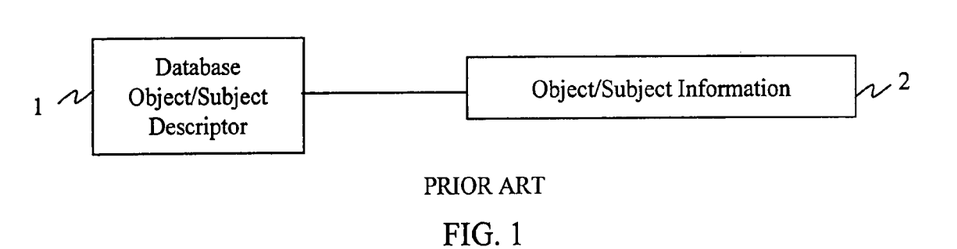
FIG. 1 is a diagram illustrating a binding of object or subject information with a conventional database object or subject descriptor.
Figure 2:
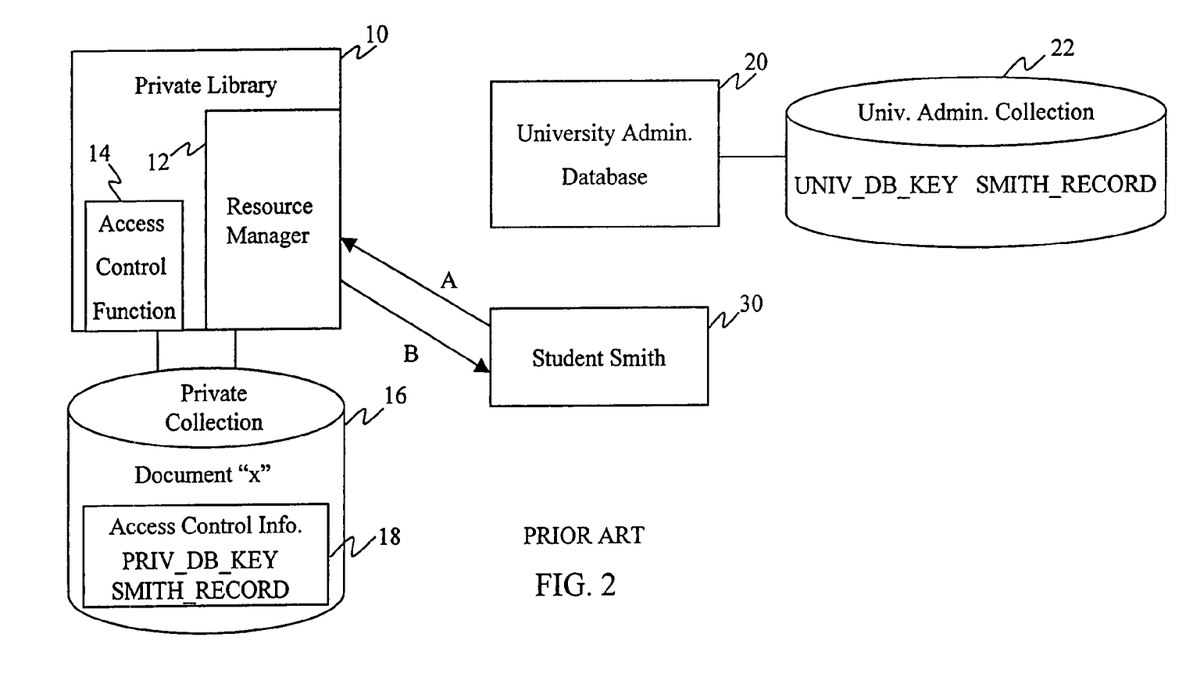
FIG. 2 is diagram of conventional access control systems.
Figure 3:
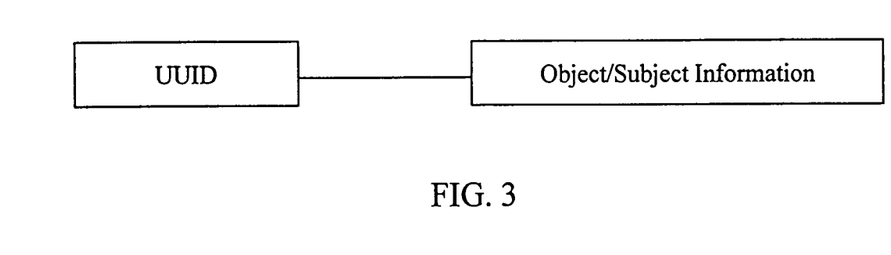
FIG. 3 is a diagram illustrating a binding of object or subject information with a UUID as an object or subject descriptor, according to the invention.

FIGS. 1 and 2 illustrate these problems. FIG. 1 shows an association between an object or subject information 2 stored in a conventional database and a database descriptor 1 for that object or subject. The descriptor 1 can be used as a key to locate the object or subject information in the database. In order to operate as a database key the descriptor 1 must be unique within the database, however, the database key is not necessarily unique outside the context of that database. This non-uniqueness is a problem when outside the administrative domain of the database the user needs to access a protected object, because a fundamental requirement of an access control service is to identify the requested protected object unambiguously. Accordingly, it is necessary for a remote user to unambiguously specify the object within the database, and for the user to be unambiguously identified to the service providing authorization to the protected object. When a request is received from within a single administrative domain the object and user identifiers need only be unique within the context of that domain. However, when a request is received outside that administrative domain, object and user identifiers must also be unique outside that domain.

FIG. 2 shows an example of a request originating from outside the administrative domain of a private library system 10 employing conventional access control mechanisms. This example presumes an agreement between the university and the private library to provide all the university's faculty and students with access to the private library's collection.

In the example shown in FIG. 2 Smith, a student at the university, sends via his computing system 30 a request "A" for access to a protected document "x" held outside the university's administrative domain in the private library's collection 12. An access control function 11 within the private library processes the request and determines whether Smith has permission to be given access to document "x." Here, access control information 13 has been stored within the private library's administrative domain and defines information about Smith and the privileges afforded him or her. Assuming those privileges are adequate to provide Smith with access to document "x," the access control function 11 returns a yes/no response "B" granting or denying Smith the requested access.

Here, the university's computing system's administrative database 20 includes access control information 22 containing information about Smith with a subject identifier UNIVER_DB_KEY unique within the context of the university's administrative database. Redundant information about Smith is maintained in the private library's conventional access control system, and has a subject identifier PRIV_DB_KEY for SMITH_RECORD in the Private Library. The private library's subject identifier is unique within the private library, but is likely to be different than the key UNIV_DB_KEY in the university's computing system. Accordingly, conventional access control systems have the problem of requiring access control information about a remote user to be stored redundantly since it must be maintained in more than one computing system. This causes extra overhead for both administrators and users.

A Universal Unique Identifier (UUID) is a known construct for uniquely identifying a data object. A UUID is described in H. M. Gladney, *Safeguarding Digital Library Contents and Users*, D-Lib Magazine, April 1998, and K. Sollins and L. Masinter, *Functional Requirements for Uniform Resource Names*, Internet Engineering Task Force RFC 1737, December 1994, both of which are incorporated herein by reference. As discussed in each of the above references, a UUID is a unique identifier that has the following characteristics: global scope and uniqueness, persistence, scalability and extensibility, independence for name-issuing authorities, and as much legacy compatibility as the other requirements allow. Although UUIDs are known, they have not before been used as an object or subject identifier in a database, much less in a database employed for access control.

SUMMARY OF THE INVENTION

An object of the invention is to reduce the significant administrative expense in providing users outside the administrative domain of a computing system access to objects with that computing system.

Another object of the invention is to permit information owners or security administrators to manage access by remote users using whatever procedures they already know and like for local users.

Yet another object of the invention is to reduce the clerical burden for remote users who desire access to objects located in an administrative domain outside the remote user's computing system's administrative domain.

Still another object of the invention is to facilitate databases that support intellectual property rights (obligations owed to copyright holders) permission management. That is, the invention unifies database support for access control and for intellectual property (e.g., copyright) permission management, with savings for software providers and for users.

Another object of the invention is to avoid duplication of data, such as data describing a user or an organization.

Still another object of the invention is to avoid unnecessarily prompting a user for access information, such as an additional password.

The present invention achieves these objects by extending conventional access control systems and methods by using universal unique identifiers (UUIDs) in authorization systems.

DETAILED DESCRIPTION OF THE INVENTION

A detailed description of preferred embodiments of the invention follows.

Using UUIDs In Databases

The invention uses Universal Unique Identifiers (UUIDs) as object or subject descriptors in a database. The invention extends conventional access control systems by distributing user or subject descriptions into one or more systems connected remotely from each other. In a distributed client/server environment user descriptions can be stored separately from organization graphs and each of those stored separately from access control information. In the invention UUIDs are used to bind the distributed subject descriptions, user descriptions and organization graphs by describing some or all of the objects in the distributed system with UUIDs which are unique across the distributed systems.

There are about five proposed standards for UUIDs, and further industry conventions. Mixtures of any of these which may emerge as a formal standard or industry convention can be used in embodiments of the invention.

A resource manager is a set of procedures which define the sole external interface to that which is stored. Whenever any resource manager draws on any other resource manager whose integrity it "trusts", it uses well-known methods to establish a safe network connection with a known level of certainty, (e.g., using a trusted name server, which itself is attached by a safe channel, and a method of agreeing on a private encryption key for a communication session such as by the Diffie-Hellman method, disclosed in U.S. Pat. No. 4,200,770). After such a connection is made, authorization checking is carried out by much the same procedures as if the resources were stored together.

For well-designed system layouts, most message interchanges needed to check authorization will be local, not remote. The invention optimizes the access control system by checking, promptly after a resource identifier is fetched, whether the referent is within the same computing system as the reference. This enables the invention to be implemented as an extension to conventional access control systems, such as that described in Gladney, *Access Control for Large Collections*, thereby propagating favorable properties, such as object orientation and outstanding performance. Implementing the invention as an extension to conventional access control systems allows for functional upward compatibility from most, if not all, commercially successful authorization systems. Moreover, the invention can be implemented to be compatible with pertinent standards, and to be optimal in certain well-defined ways.

A FIRST EMBODIMENT

Figure 4:
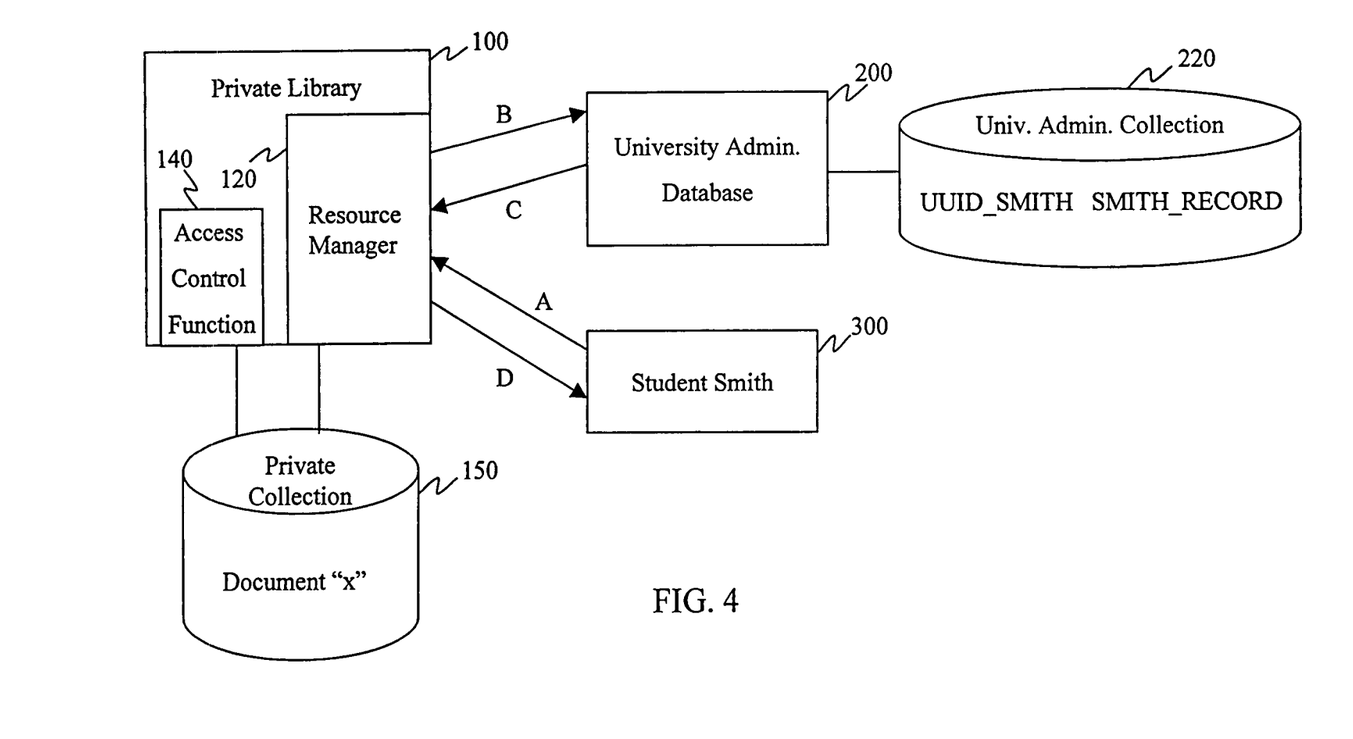
FIG. 4 is a diagram of an access control system according to a first embodiment of the invention.

FIG. 4 shows an access control system employing a first embodiment of the invention in the context of the university/private library example discussed above. In this example an access control function 110 operates as part of the private library 100 and in conjunction with access control information (not shown), and comprises an access control reference monitor. The private library includes a private collection 120, which holds a document "x".

External to the private library's administrative domain is the university's computing systems. The university's computing systems include an administrative database 200 managing an administrative collection 220 holding administrative records about university faculty, staff and students 200.

The records stored within the administrative collection 200 are stored according to the invention. That is, each record is stored bound to a UUID as a descriptor of that record. In this example the administrative record for a student named "Smith" is stored in the university's administrative collection 220, and bound to that record is a UUID subject descriptor or identifier (i.e., UUID_SMITH which uniquely identifies that record. Even if more than one student named "Smith" is enrolled in the university, the UUID uniquely identifies the administrative record for only one of the "Smiths." The administrative record may indicate information about the person, such as his/her name, social security number, date of matriculation, affiliation with a university organization (e.g., faculty, staff, student). Not only does the UUID subject descriptor uniquely identify the record for that particular "Smith" within the context of the university's administrative database, but it uniquely identifies that record even outside the context of the university's database.

In this example the access control function 100 includes the capability to resolve a UUID to determine the location of the referenced object or subject. However, the means for resolving the UUID need not be located in the access control function, but can be located wherever is most practical based on the particular system's requirements. For example, the means for resolving a UUID can be a trusted name server separate from the access control function, and even separate from the private library's administrative domain.

As with the example of FIG. 2 the present example presumes an agreement between the private library and the university, in which the private library will provide access to its collection to all university faculty and students. Here, Smith is a university student desiring access to document "x" held within the private collection 120. In the conventional access control system the private library would maintain within its administrative domain access control information specific to the student so that the access control function 110 could determine whether to grant Smith permission to access the requested object.

The invention eliminates the need for the private library to maintain such redundant access control information, thereby reducing system administration cost and burden. Moreover, it allows a remote user, such as Smith, to access the object, i.e., document "x", without imposing burdensome clerical constraints on the user such as having to enter a special password conforming to the private library's access control mechanisms.

In all the embodiments described here it will be understood that request and response messages travel over secure and trusted communications links. The communication links those message travel over are established by well-known procedures such as by the Diffie-Hellman method. Well-known certificate mechanisms and hierarchies of trust can be used to ensure authenticity and provenance of transmitted information. See J. Bacon et al., "Middleware for Digital Libraries," D-Lib Magazine (October 1998), and H. Gladney, "Safeguarding Digital Library Contents and Users," D-Lib Magazine (July/August 1998). Since these methods and mechanisms are well known, they will not be described here further.

In the example shown in FIG. 4 Smith sends a request "A" to the private library's access control function 110. The request "A" specifies at least an identifier for document "x" and the UUID for Smith's administrative information held in the university's administrative database. Although not shown in FIG. 4, Smith's computing system 300 could obtain the UUID by requesting it from a source within the university, possibly even from the university's administrative database 200.

Upon receiving request "A", the access control function resolves the UUID and determines the location of the subject information described by the UUID. The UUID resolution is performed in a conventional manner such as by using a name server as described above. In this case the UUID, when resolved, indicates that subject information about Smith is located in the university's administrative database 200. Accordingly, the access control function 110 sends a request "B" containing the UUID to the university database 200 in order to retrieve portions of the subject information to perform the required access control services. Since the Smith subject information is bound to a UUID as opposed to a globally non-unique database key, the private library's access control function 110 does not need to specify a subject identifier specific to the context of the university's administrative database. Accordingly, the private library's system administrator does not need to know of context specific identifiers used in the university's computing systems.

The university's administrative database, upon receiving request "B" including the subject UUID, finds the subject information (i.e., Smith's university administrative record) and returns the requested portion(s) of it to the private library in response "C". In this case, due to the agreement between the private library and the university, it would be sufficient for the subject information in response "C" to indicate that Smith is a student at the university. Upon receiving the subject information in response "C", the access control function determines whether to grant Smith permission requested document "x", and returns a yes/no response "D" to Smith.

Since the access control function only needs to know whether the requester is a student at the university, the access control information stored for the object is greatly simplified (i.e., students of the university are privileged to access document "x".) Since Smith is a student at the university, a "yes" response is returned in message "D" and Smith is given access to document "x". If the response in "D" is "no" Smith optionally can be provided with further information, such as a reason code indicating why access was denied.

A SECOND EMBODIMENT

Figure 5:
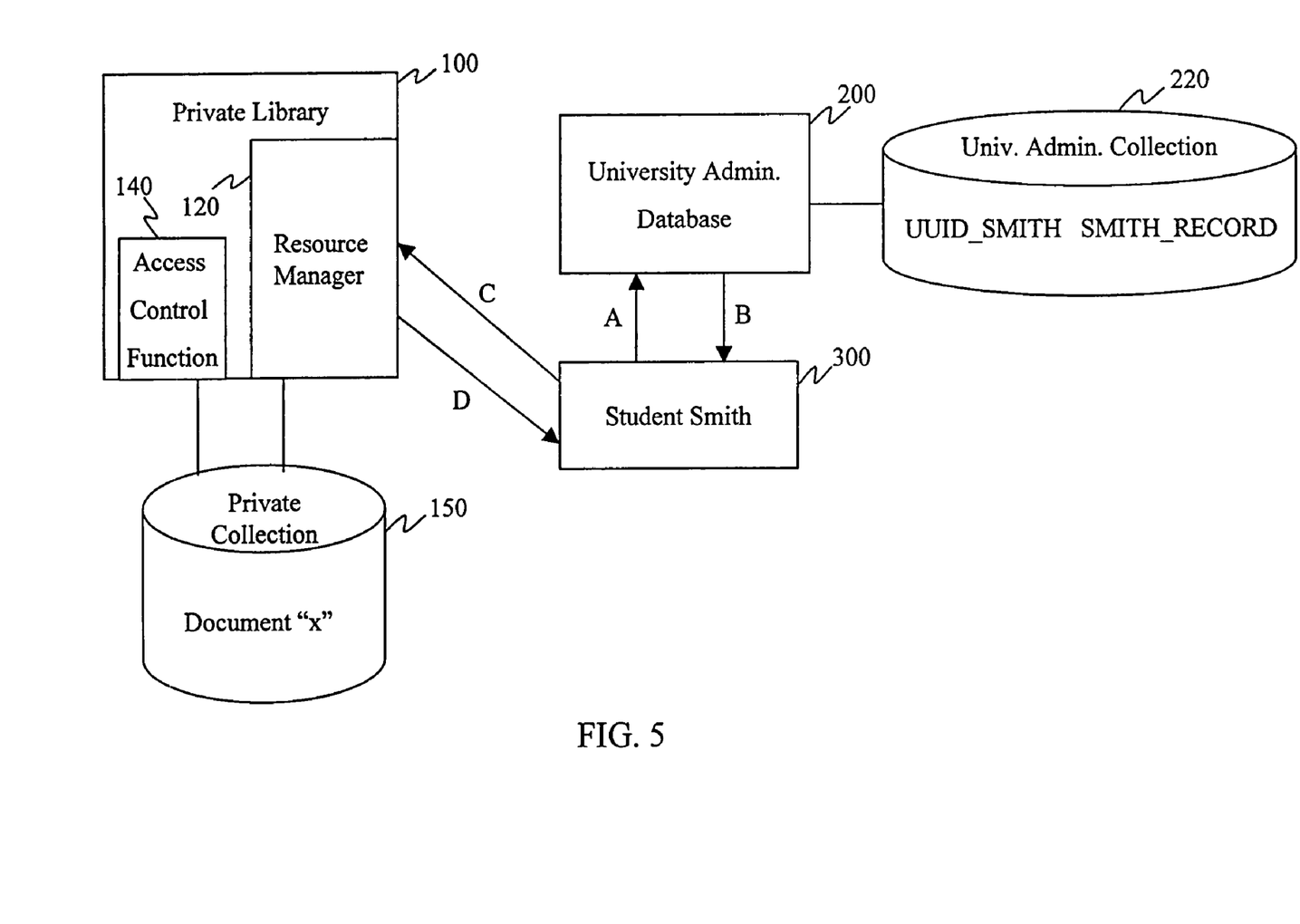
FIG. 5 is a diagram of an access control system according to a second embodiment of the invention.

FIG. 5 shows a second embodiment of an access control system using the invention. Here, instead of the access control function 110 resolving the UUID, the user computing system 300 gathers from the university's administrative database the subject information required by the access control function 110. In this case the user, Smith, knows of information needed by the private library's access control function and gathers it by sending a request "A" to the university administrative database 200 with the UUID for the subject information. The database retrieves the information in the same manner as in the first embodiment, but returns it, via response "B", to the user's computing system 300. The user's computing system 300 then sends to the private library's access control function 110 in request "C" the information retrieved from the university's database. The access control function is performed in the same manner as previously described and a yes/no response "D" is returned to the user, thereby granting or denying Smith access to document "x".

A THIRD EMBODIMENT

Figure 6A:
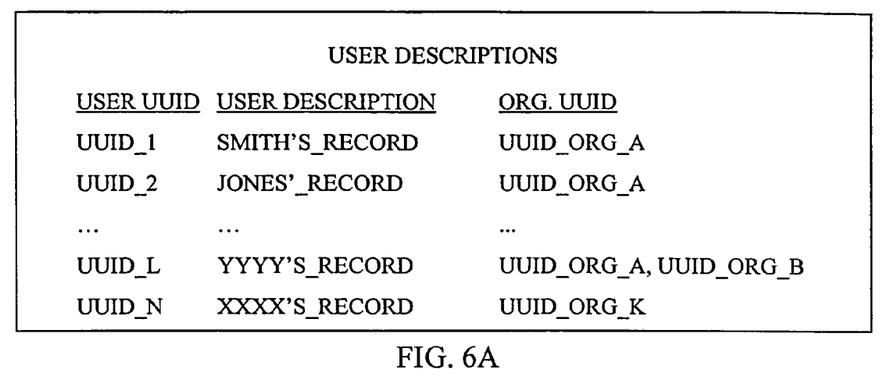
FIGS. 6A-D show examples of several types of information stored in a database along with corresponding UUIDs as descriptors, according to the invention.
Figure 6B:
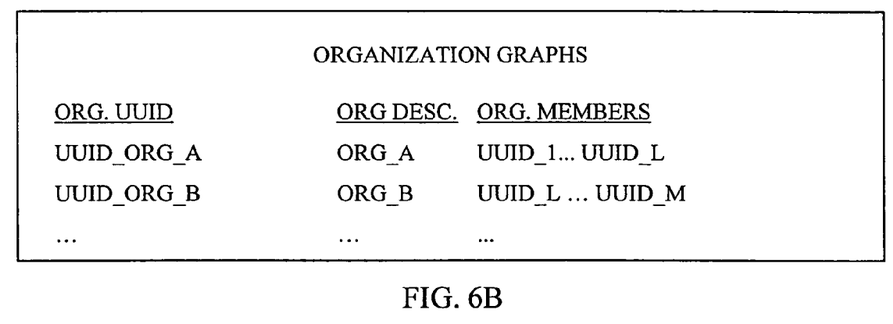
Figure 6C:
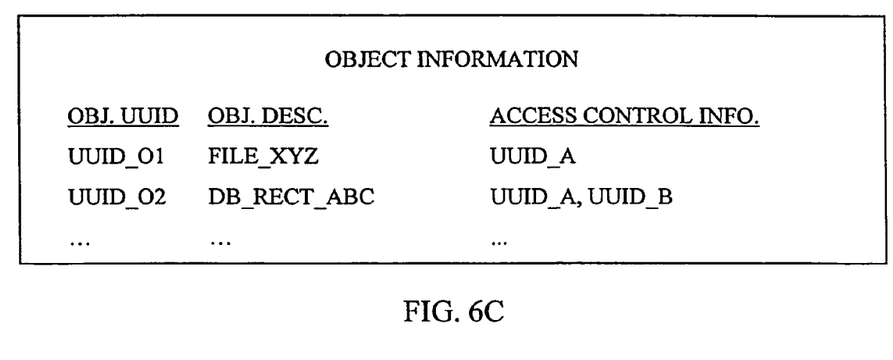
Figure 7:
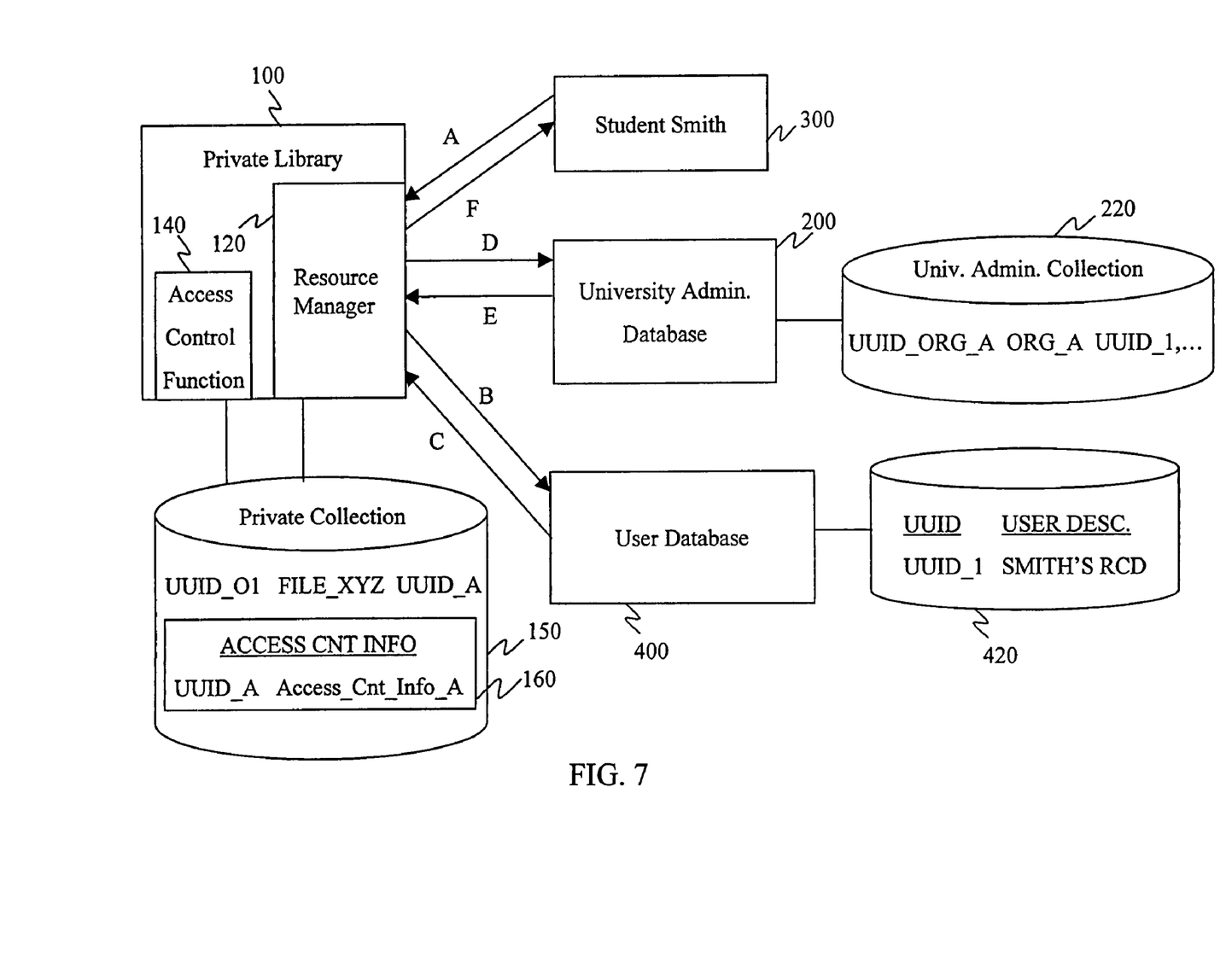
FIG. 7 is a diagram of an access control system according to a third embodiment of the invention.

In a third embodiment subject information, organization information and object information are bound to UUIDs, which permit even greater distribution of such information. FIGS. 6A-C show an example of these types of information in the context of user descriptions, organization graphs and object information. FIG. 7 shows an access control system according to the third embodiment.

Figure 6D:
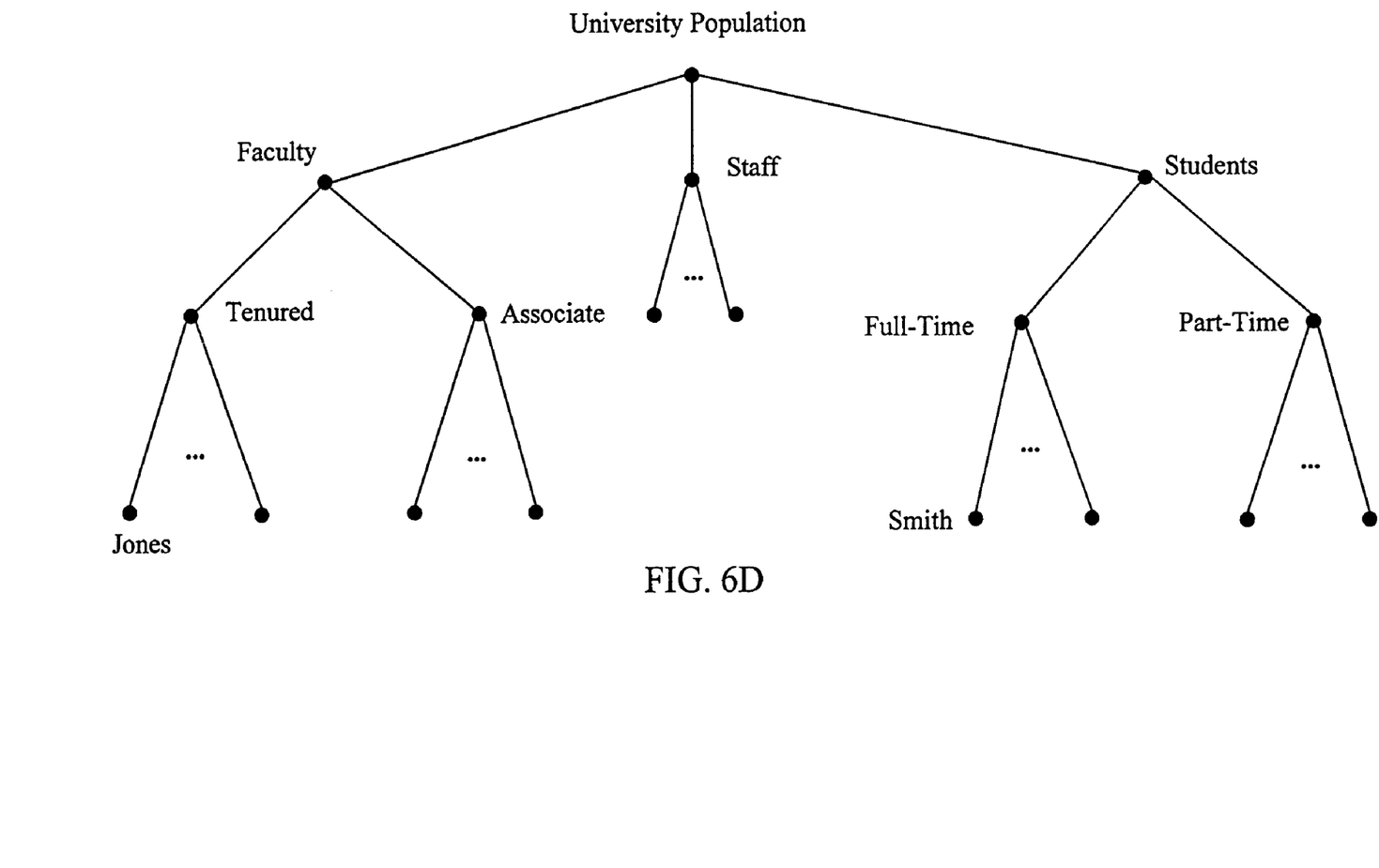

Here, the university administrative database 200 includes in the administrative collection 220 organization information bound to organization UUIDs, as depicted in FIG. 6B. The organization information specifies as a graph, members of the organization. For example, organization A (ORG_A) is comprised of subjects "1" through "L" and organization B (ORG_B) is comprised of subjects "L" through "M". Each of the organization information is bound to an organization UUID (e.g., UUID ORG_A). The organization information can be viewed as an organization graph as shown in FIG. 6D.

In this example a user database 400, separate from the administrative database 200, holds in a user database collection 420 user information bound to user UUID's. FIG. 6A shows user description information which can include an organization field to specify by UUID the organization(s) to which the user belongs.

In the private library's collection 120, protected objects can be stored bound to object UUIDs. FIG. 6C shows example object information stored in the private collection 120. A file is a type of protected object held in the private collection 120. In this case the file FILE_XYZ is bound to an object UUID, "UUID_O1". Also held in the private collection, although it could be held in another store, is access control information 130 for the protected objects. Access control information is an object, which too can be described with an object UUID. In the example shown in FIG. 6C two access control objects are identified by "UUID_A" and "UUID_B," respectively. Here, "FILE_XYZ" is bound to "UUID_O1" and is associated with access control information described by "UUID_A". The other object shown in FIG. 6C is a database rectangle "DB_RECT_ABC" bound to "UUID_O2" and associated with two access control objects described by "UUID_A" and "UUID_B", respectively.

In the system shown in FIG. 7, the university student Smith sends a request "A" to the private library access control function 110 for access to FILE_XYZ. The request "A" in this example includes Smith's user UUID (UUID_1) and the UUID of the requested file (UUID_O1). Upon receipt of request "A" the access control function 110 resolves Smith's UUID and sends a request "B" to a user database 400 to retrieve subject information about Smith. The user database 400 finds Smith's user information based on the UUID supplied in request "B", and returns the requested information in response "C".

In this case the user's information contains a descriptor about the organizations of which Smith is a member. That organization descriptor is a UUID which when resolved indicates the location of the organization information. Here, Smith's user information specifies an organization UUID (UUID_ORG_A), which resolves to organization information held in the university administrative database 200. Accordingly, the access control function 110 sends request "D" containing "UUID_ORG_A" to the university administrative database 220. The organization information "ORG_A" is present in the university administrative collection 220 and is located based on the organization UUID included in request "D". The organization information located in the university administrative database is returned in response "E".

Based on the returned organization information access control function 110 determines whether Smith should be granted access to the requested protected object. In this case since Smith is a student of the university, the organization information returned from the university administrative database 200 indicates he is a member of an organization (university students) who by virtue of the agreement are to be provided access to the protected object. Accordingly, access control function 110 returns a response "F" to Smith indicating access to FILE_XYZ is granted.

A FOURTH EMBODIMENT

Figure 8:
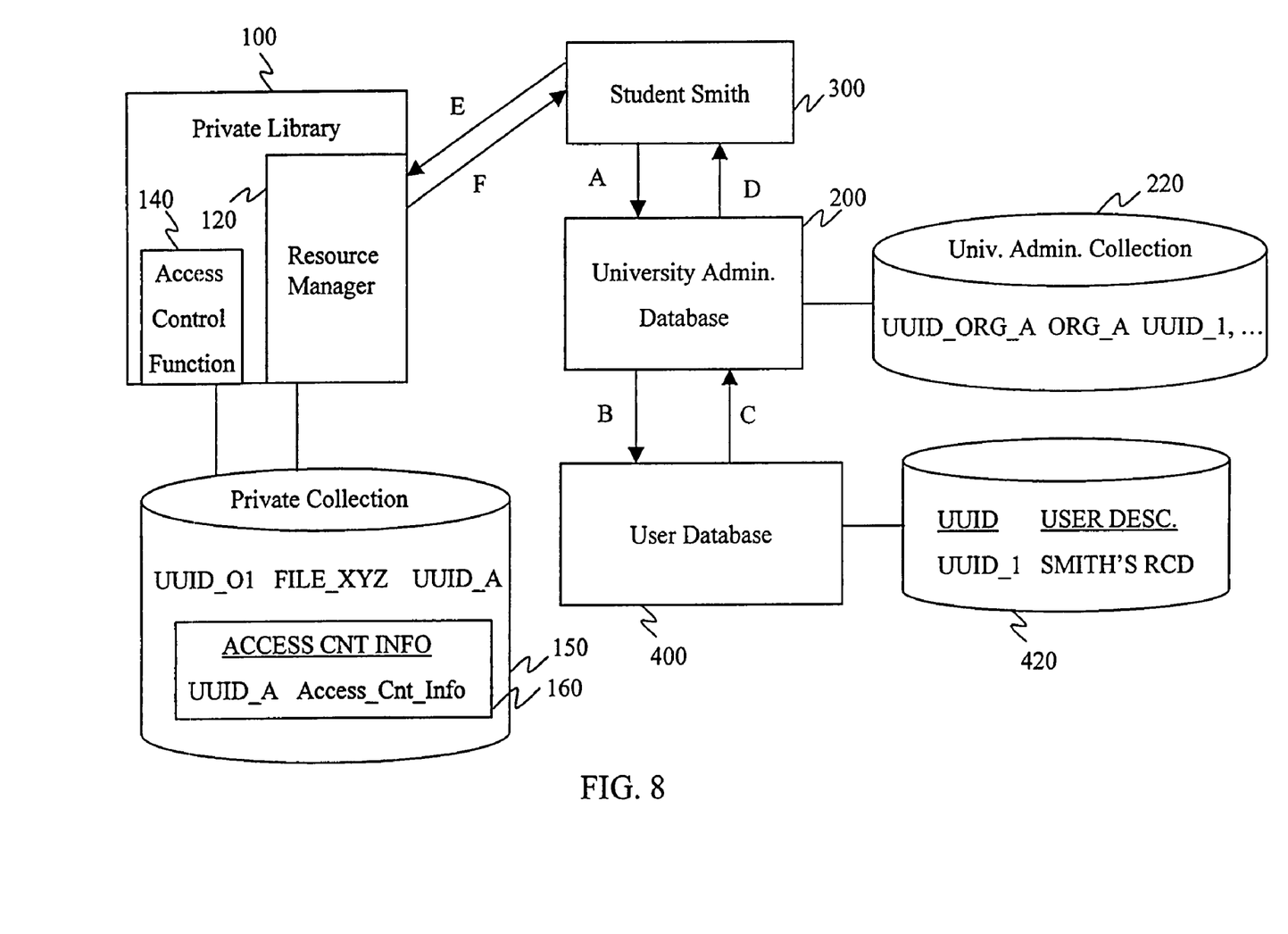
FIG. 8 is a diagram of an access control system according to a fourth embodiment of the invention.

FIG. 8 shows a fourth embodiment of an access control system employing the invention. This embodiment is similar to the third embodiment, except instead of the access control function 110 resolving UUIDs, the other distributed computing system resolves them.

When student Smith wants to be provided access to a protected object, such as FILE_XYZ in private library collection 120, Smith's computing system 300 first gathers the information needed by the access control function 110. Here, Smith's computing system 300 sends a request "A" to the university administrative database 200 to retrieve organization information for organizations for which Smith is a member. In this example, however, in order to determine those organizations the university administrative database 200 sends to user database 400 a request "B" which includes Smith's UUID (i.e., UUID_1). User database 400 finds Smith's user information based on Smith's user UUID (i.e., UUID_1), and returns it in response "C".

Smith's user information includes organization UUIDs describing the organizations in which Smith is a member (i.e., UUID_ORG_A, see FIG. 6A). The university administrative database 200 finds the organizations described by UUID_ORG_A, and retrieves the organization information needed by the access control function 110. That organization information is returned to the user's computing system 300 in response "D".

Once the user's computing system 300 gathers all the information needed by access control function 110 it sends that information (i.e., a request for access to document "x" and an indication that Smith is a student at the university) in a request "E". The access control function 110 determines if access to the requested object should be granted and returns a yes/no response "F" which either grants or denies the requested access, and optionally provides additional useful information.

Other modifications and variations to the invention will be apparent to those skilled in the art from the foregoing disclosure and teachings. For example, the subject organization and object descriptors described here can be conventional descriptors when the subject or object information is located within the administrative domain and will be accessed by mainly local users. Optionally, a flag in the descriptor can indicate whether the descriptor is a local descriptor or a UUID. Accordingly, if it is a local descriptor it is used as in the conventional access control system and no UUID must be resolved, thereby optimizing the system and providing upwards compatibility.

Another alternative is to store a pointer in the database in place of the descriptor, which can solve problems with having a variable length descriptor. A fixed-length pointer can point to a variable length descriptor, which could be a UUID, which allows the UUID to be of virtually unlimited length. Thus, while only certain embodiments of the invention have been specifically described herein, it will be apparent that numerous modifications may be made thereto without departing from the spirit and scope of the invention.

What is claimed is:

1. An information storage management system in a first administrative domain administered by a first organization, comprising:
   a collection of stored objects in the first administrative domain administered by the first organization;
   an access control unit in the first administrative domain administered by the first organization for determining if a requester is authorized to access a protected object stored in the collection in the first administrative domain administered by the first organization;
   a resource manager connected to the access control unit and to a communications channel;
   wherein the resource manager receives a user's request for access to the protected object in the first administrative domain administered by the first organization, the request including a globally unique identifier for the user requesting the access, and in response to the user's request, the resource manager sends over the communications channel to an external storage management system in a second administrative domain administered by a second organization that is different from the first organization, a resource manager request for information about the user, the resource manager request including the globally unique identifier; and wherein the resource manager upon receiving a response to the resource manager request from the external storage management system passes the user information to the access control unit in the first administrative domain administered by the first organization; and wherein responsive to the user information the access control unit determines whether to authorize the user for access to the protected object.

2. The information storage management system of claim 1, wherein the globally unique identifier is a Universal Unique Identifier (UUID).

3. The information storage management system of claim 1, wherein the user information is organization information indicating whether the user is a member of an organization.

4. An information storage management system in a first administrative domain administered by a first organization, comprising:

a collection of stored objects in the first administrative domain administered by the first organization;

an access control unit in the first administrative domain administered by the first organization for determining if a requestor is authorized to access a protected object stored in the collection in the first administrative domain administered by the first organization;

a resource manager connected to the access control unit and to a communications channel;

wherein the resource manager receives a user's request for access to the protected object in the first administrative domain administered by the first organization, the request including a globally unique identifier for the user requesting the access, and in response to the user's request the resource manager resolves the globally unique identifier to a user identifier recognized by an external storage management system in a second administrative domain administered by a second organization that is different from the first organization, the resource manager sending to the external storage management system a resource manager request for information about the user, the resource manager request including the resolved user identifier; and wherein the resource manager upon receiving a response to the resource manager request from the external storage management system passes the user information to the access control unit in the first administrative domain administered by the first organization; and wherein responsive to the user information the access control unit determines whether to authorize the user for access to the protected object.

5. The information storage management system of claim 4, wherein the globally unique identifier is a Universal Unique Identifier (UUID).

6. The information storage management system of claim 4, wherein the user information is organization information indicating whether the user is a member of an organization.

7. The information storage management system of claim 4, wherein the resource manager resolves the globally unique identifier by using a name server.

* * * * *